Oct. 17, 1933.    O. E. FISHBURN    1,931,316
ROLLER CLUTCH
Filed Jan. 5, 1931    2 Sheets-Sheet 1
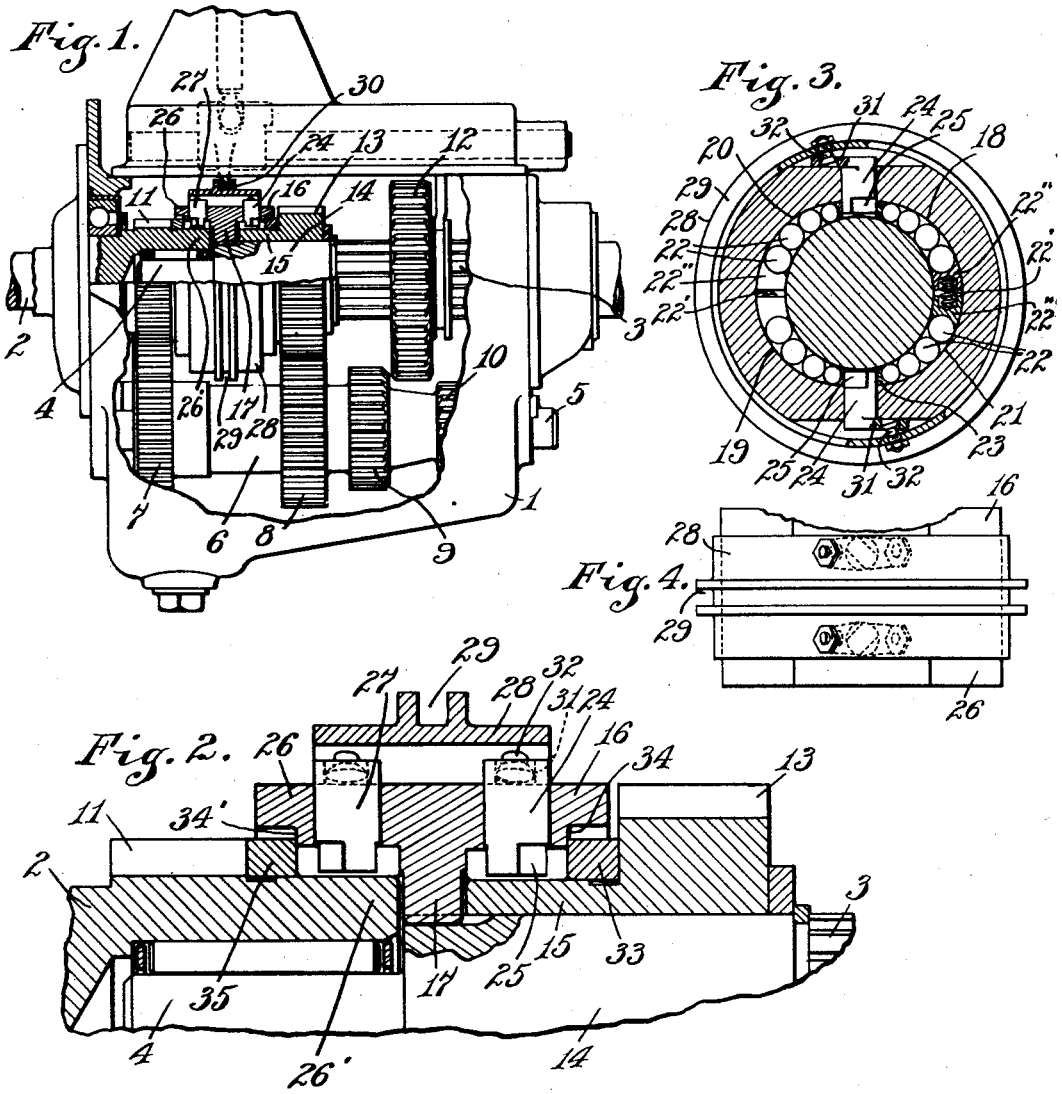
INVENTOR.
Otto E. Fishburn,
BY
Hood + Hahn.
ATTORNEYS

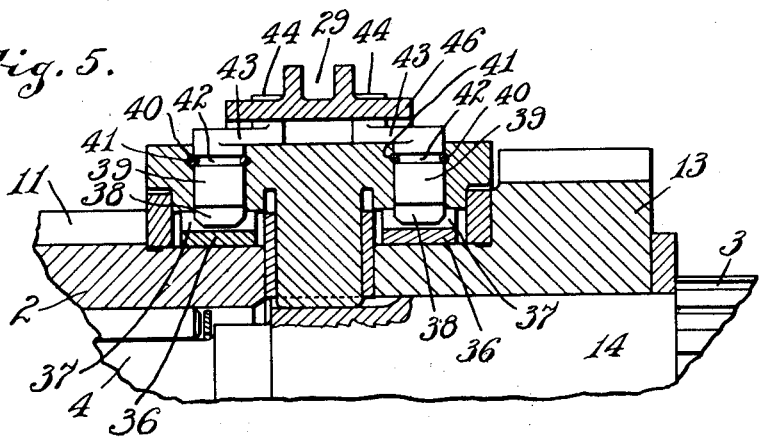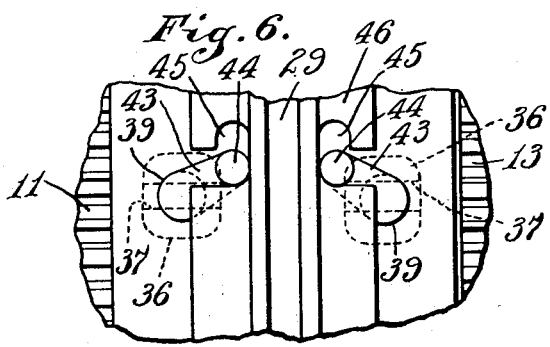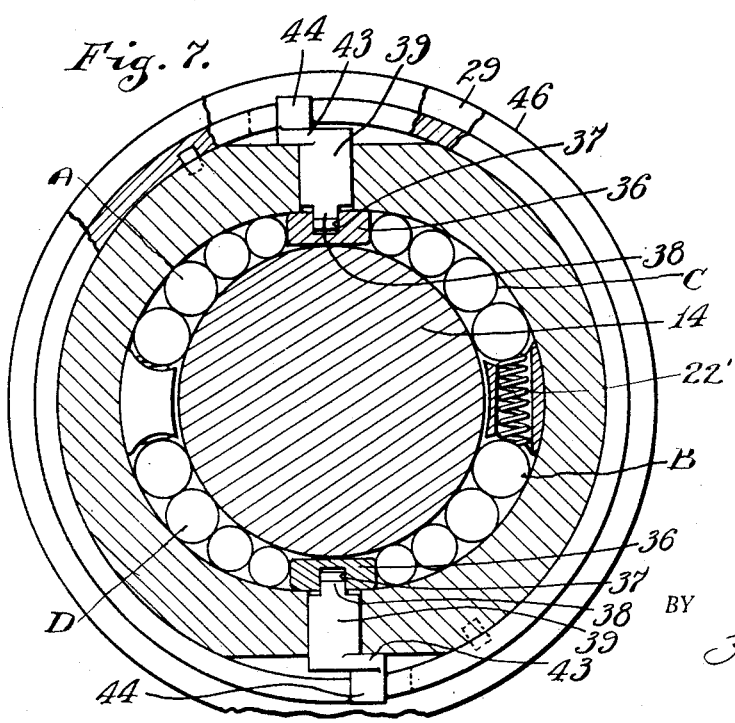

Patented Oct. 17, 1933

1,931,316

UNITED STATES PATENT OFFICE 1,931,316

ROLLER CLUTCH

Otto E. Fishburn, Muncie, Ind.

Application January 5, 1931. Serial No. 506,711

2 Claims. (Cl. 192—71)

My invention relates to improvements in roller clutching mechanism and means for operating the same and has for one of its objects the provision of a roller clutching mechanism particularly adapted for use in an automobile transmission.

One of the objects of my invention is to provide a roller clutching mechanism for use in connection with an automobile transmission and easily manipulated means for controlling the operation of said clutching mechanism.

For the purpose of disclosing my invention I have illustrated certain embodiments thereof in the accompanying drawings, in which:

Fig. 1 is a side elevation, partially in section, of an automobile transmission embodying my invention;

Fig. 2 is a longitudinal sectional view showing my roller clutch mechanism more in detail;

Fig. 3 is a transverse sectional view of one of the roller clutch structures;

Fig. 4 is a detailed plan view of the manipulating ring;

Fig. 5 is an enlarged detailed sectional view of a modification of my invention;

Fig. 6 is a detailed plan view of the manipulating mechanism for the structure illustrated in Fig. 5, and Fig. 7 is a transverse sectional view of one of the roller clutches shown in Fig. 5.

In the embodiment of the invention illustrated I provide an automobile transmission having the usual housing 1 into one end of which is projected the driving shaft 2 and into the opposite end of which is projected the driven shaft 3, the free end of the shaft 3 being piloted as at 4 within the driving shaft 2.

A jack shaft 5 is mounted below the driving and driven shaft and this shaft has mounted thereon a spindle 6 provided with gears 7, 8, 9, and 10. The gear 7 is in constant mesh with and is driven from a gear 11 on the drive shaft 2. The gear 9 is adapted to be meshed with an axially shiftable gear 12 splined on the shaft 3, which gear 12 is also adapted to be meshed with an idler, not shown, meshing with the gear 10. When the gear 12 is in mesh with the idler, the driven shaft 3 is driven in a reverse direction and when the gear 12 is in mesh with the gear 9 the driven shaft is driven at low speed.

The gear 8 is in constant mesh with a gear 13 rotatably mounted on a barrel portion 14 of the shaft 3 and when this gear 13 is locked to the shaft 3 the driven shaft is operated at second speed.

For the purpose of connecting the gear 13 to the shaft 3 the hub of the gear 13 is provided with an extension 15 providing the inner member of a clutch. The outer member 16 of the clutch overhangs the hub 15 and is mounted on an annular ring 17 splined to the shaft 3. This outer member 16 has formed on its inner face a pair of surfaces 18 and 19 eccentric to the axis of the shaft 3 and extending in one direction and a second pair of surfaces 20 and 21 likewise eccentric to the axis of the shaft 3 and extending in the opposite direction. Each of the eccentric surfaces has interposed therebetween, and the hub 15, a series of rollers 22 gradually diminishing in diameter. These rollers are urged toward the lower portion of the surface by means of coiled springs 22' interposed between shoes 22'' interposed between the series of rollers. By this arrangement, unless restrained from movement, the rollers, on relative movement, between the outer and inner members 16 and 15 tend to move towards the narrow portion of their recesses and thus lock the members 16 and 15 together. Interposed between the oppositely disposed sets of rollers are bearing blocks 23, which are adapted to be engaged by spreading members. Each of these spreading members extends radially through the outer clutch member and comprises a rotatable pin 24, the bottom portion of which is flattened on its opposite sides as at 25, so that, when the flattened sides extend parallel with the axis of the clutch members the rollers 22 may move in their recesses, but when the pins are rotated so that the flattened portion extends transversely to the axis of the clutch members, the blocks 23 are spread and movement of the rollers is prevented.

A second outer clutch member 26, similar to the clutch member 16, is mounted on the ring 17 and this clutch member overhangs a barrel portion 26' on the driving shaft, which barrel portion constitutes the inner member of a second clutch similar in construction to the clutch heretofore described. The rotating pins or wedging members 27 are similar to the members 24 and act in the same manner. For manipulating the rotating wedging members 24 and 27, I provide an axially shiftable ring 28 having an annular groove 29 therein, which receives a shifting fork 30 manipulated by the shifting lever of the transmission. Each of the wedging members 24 and 27 is provided with a crank arm 31 connected by a pin 32 with the ring 28 so that, as the ring is moved axially the wedging members will be rotated. The connection between the wedging members and the ring is such that when the ring is in its neutral position, the wedging members will be rotated a sufficient distance, to prevent the operation of the rollers of both clutches. If, however, the ring is moved axially to the right looking at Figs. 1 and 2 the wedging members 24 will be rotated until the surfaces 25 extend parallel to the axis of the members of the clutch whereby the rollers will be permitted to move in locking direction. At the same time the members 27 will be rotated in a direction to cause their parallel flat surfaces to extend transversely of the axis of the clutch members thereby preventing locking movement of its rollers. This clutches the gear 13 to the shaft 3 so that, the shaft 3 will be driven at second speed. If, however, the ring 28 is moved to the left, looking at Figs. 1 and 2, the rotating wedging members 24 will render the clutch rollers, controlled by them, ineffective, while permitting the clutch rollers controlled by the wedging members 27 to become effective, whereby the clutch will operate to directly connect the shafts 2 and 3.

The rollers of each clutch are prevented from axial displacement in their respective recesses by the ring 17 and by a ring 33 interposed between a shoulder 34 and the face of the gear 13 and the ring 35 interposed between the ends of the teeth 11 and a shoulder 34'. These spacer rings 33 and 35 also prevent axial displacement of the outer member constituting the outer clutch members 16 and 26.

In Figs. 5, 6 and 7, I have illustrated a slightly modified construction. The modification consists primarily in the difference in construction of the wedging members. In this construction instead of having the flat portions 25 directly engage the rollers, I provide wedging blocks 36 slotted on the tops at 37 to receive the flattened ends 38 of the rotating pins 39. These pins are held in position by means of split rings 40 fitting within grooves 41 in the pin openings and in annular grooves 42 in the pins. The pins 39 are provided with cranks 43 having crank pins 44 which take into bayonet slots 45 in a ring 46, corresponding to the ring 28. Due to the shape of the slots 45, when the ring is moved axially one of the pins 44 will be unaffected as it will ride in that portion of the slot 45 which extends parallel with the axis of the ring. The other pin will be moved rocking its crank 43 and in this movement the pin will slide in that portion of the slot 45 extending transversely of the axis of the ring. This portion of the slot 45 not only permits the movement of the pin 44 but provides a means for rocking the crank in the opposite direction when the ring is brought back to "neutral" position. When the blocks 36 occupy the position illustrated in the drawings with the slots 37 extending longitudinally of the axis of the rotating members of the clutch the blocks are held against movement by the portions 38 and the rollers controlled by these blocks are likewise held against movement, so that, they are held out of locking position. If, however, the ring 46 is moved to the right looking at Figs. 5 and 6 the blocks of the right hand set of pins are rotated, the left hand pins being unaffected, until the slots are transverse to the axis of the clutch rotating members so that, the blocks are free to slide on the portions 38 permitting the movement of the rollers so that they may move to locking position. If the ring 46 is moved to the left rotating the left hand set of blocks and leaving the right hand unaffected, the left hand set of blocks will be rotated until their slots are transverse to the axis of the rotating members of the clutch permitting the rollers controlled thereby to move to operating position. It is thus seen that by a right hand movement of the ring 46 the gear 13 is connected to the shaft 3 whereby the shaft will be driven at second speed. The left hand movement of the ring will directly connect the shafts 2 and 3 thus driving the shaft 3 directly from the shaft 2.

It will be observed that the clutch includes four sets A—B and C—D of rollers, two of which A—B are adapted to actuate in the same direction while the other two C—D actuate in the opposite direction. Interposed between the sets B and C are the coiled springs 22' and similar springs are interposed between the set A and D. When the crank arms are rotated to move the slots in a position transversely of the axis of the parts, movement of the blocks will be permitted, and due to the friction between the rollers and the clutch surfaces two of the sets, say A and B, will be moved into actuating position while the opposing two sets C and D will move in the same direction to permit this movement of the sets A and B. However, the sets C and D will be moving in a non-actuating direction. If the coiled springs 22' are stationarily mounted, the resiliency of these springs will permit the sets C and D to move sufficiently to permit the sets A and B to move into actuating position.

I claim the following:

1. In a device of the character described, the combination with an inner rotary member and an outer rotary member, one of which is provided with a peripheral surface eccentric to the axis of said members, of wedging members interposed between said rotary members, a radially disposed rotatable stop member extending through the outer rotary member, which in one position permits the movement of said wedging members and in another position prevents the movement of said wedging members and a shift ring surrounding said clutch members and connected to said stop members, and axially shiftable to rotate said stop member.

2. In a device of the character described, the combination with an inner rotary member and an outer rotary member one of which is provided with oppositely extending peripheral surfaces eccentric to the axis of said members, of wedging members interposed between said eccentric surfaces and the surfaces of the inner rotary member, a radially disposed rotating stop member interposed between the two sets of wedging members which in one position permits the movement of both sets of wedging members and in another position prevents said movement and a shift ring surrounding said clutch members and connected to said stop member, and axially shiftable to rotate said rotatable member.

OTTO E. FISHBURN.